(12) United States Patent
Zetterstrand et al.

(10) Patent No.: US 11,754,171 B2
(45) Date of Patent: Sep. 12, 2023

(54) GEARWHEEL ARRANGEMENT

(71) Applicant: Volvo Truck Corporation, Gothenburg (SE)

(72) Inventors: Lars Zetterstrand, Gothenburg (SE); Staffan Cassel, Trollhättan (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/488,036

(22) Filed: Sep. 28, 2021

(65) Prior Publication Data

US 2022/0099176 A1 Mar. 31, 2022

(30) Foreign Application Priority Data

Sep. 29, 2020 (EP) .................................... 20198955

(51) Int. Cl.
*F16H 57/04* (2010.01)
*F16H 1/04* (2006.01)
*F16H 1/08* (2006.01)

(52) U.S. Cl.
CPC ........... *F16H 57/0431* (2013.01); *F16H 1/08* (2013.01); *F16H 57/0426* (2013.01)

(58) Field of Classification Search
CPC ...... F16H 1/08; F16H 57/042; F16H 57/0431; F16H 57/0426
See application file for complete search history.

(56) References Cited

U.S. PATENT DOCUMENTS

| | | | | |
|---|---|---|---|---|
| 9,371,888 | B2 * | 6/2016 | Tokozakura | ........ F16H 57/0431 |
| 2007/0175706 | A1 * | 8/2007 | Shilo | .................... F16H 57/0427 |
| | | | | 184/6.12 |
| 2009/0165588 | A1 | 7/2009 | Yasuda et al. | |
| 2022/0099170 | A1 * | 3/2022 | Persson | ............... F16H 57/0426 |
| 2023/0023243 | A1 * | 1/2023 | Hagerman | .......... F16H 57/0431 |

FOREIGN PATENT DOCUMENTS

| | | | | |
|---|---|---|---|---|
| CN | 104088985 A | * | 10/2014 | ............. F16H 55/17 |
| CN | 112112905 A | * | 12/2020 | ............... F16D 3/18 |
| DE | 102014210689 A1 | * | 12/2015 | ............. F16H 57/01 |
| DE | 102016013430 A1 | * | 5/2018 | |
| GB | 1359321 A | * | 7/1974 | ............... F16H 1/20 |

(Continued)

OTHER PUBLICATIONS

Machine translation of JP 2005-320998 A obtained on Oct. 31, 2022.*

(Continued)

*Primary Examiner* — Adam D Rogers
(74) *Attorney, Agent, or Firm* — Sage Patent Group

(57) ABSTRACT

A gearwheel arrangement for a transmission of a vehicle, such as an electric vehicle, including:
  a shaft extending along a longitudinal axis of rotation, including an internal axial duct for guiding lubricant,
  a gearwheel including a base portion centered on the shaft and a plurality of gear teeth provided around a periphery of the gearwheel, the gearwheel preferably being configured for common rotation with the shaft.
The gearwheel arrangement further includes an internal radial duct for guiding lubricant from the internal axial duct to the gear teeth. The internal radial duct may extend at least in part behind a gearwheel cover.

19 Claims, 3 Drawing Sheets

(56) References Cited

FOREIGN PATENT DOCUMENTS

| JP | S52103276 U | | 8/1977 | |
|---|---|---|---|---|
| JP | 60168920 A | * | 9/1985 | |
| JP | S6280073 U | | 5/1987 | |
| JP | H1038057 A | * | 2/1998 | |
| JP | 2002156029 A | * | 5/2002 | ......... F16H 57/0463 |
| JP | 2005320998 A | * | 11/2005 | ......... F16H 57/0483 |
| JP | 2007002878 A | | 1/2007 | |

OTHER PUBLICATIONS

Machine translation of DE 102014210689 A1 obtained on Jan. 31, 2023.*

* cited by examiner

GEARWHEEL ARRANGEMENT

CROSS-REFERENCE TO RELATED APPLICATIONS

The present application claims benefit of priority to European Patent Application No. 20198955.5, filed Sep. 29, 2020, and is assigned to the same assignee as the present application and is incorporated herein by reference.

TECHNICAL FIELD

The invention relates to a gearwheel arrangement, a gear assembly, a transmission for a vehicle, a powertrain of a vehicle, and a vehicle.

The invention can be applied in heavy-duty vehicles, such as trucks, buses and construction equipment. Although the invention will be described with respect to a truck, the invention is not restricted to this particular vehicle, but may also be used in other vehicles such as buses, trailers, wheel loaders, excavators, passenger cars, etc. The invention is particularly applicable in electrically operated vehicles, powered by one or more electric machines.

BACKGROUND

In vehicle transmissions, cooling and lubrication of gearwheels are commonly achieved by providing a lubricant sump, or lubricant bath, in a housing of the transmission, into which gear teeth of some of the gearwheels are immersed. The meshing engagement of the gear teeth ensures that the lubricant spreads to the gearwheels not being immersed into the lubricant sump. Another method is to provide lubricant from above, for example by dripping or spraying lubricant onto the gear teeth. These are simple and efficient ways of providing efficient cooling in transmissions of vehicles driven by an internal combustion engine.

However, in electrically operated vehicles provided with one or more electric machines for propulsion of the vehicle, the rotational speeds of the gearwheels in the transmission may often be significantly higher than in the case of a vehicle powered by an internal combustion engine, since electric machines are typically operated at higher rotational speeds than internal combustion engines. In particular, this is valid for heavy-duty vehicles in which large gear ratios are necessary. This leads to problems with lubrication and cooling of the gearwheels, since the rapidly rotating gearwheels tend to throw lubricant provided by means of e.g. a lubricant sump outward and prevent efficient lubrication of the gearwheels.

SUMMARY

A primary object of the invention is to alleviate the above defined problem relating to gearwheel lubrication. In particular, it is an object to provide a gearwheel arrangement suitable for use in transmissions of electric or partially electric powertrains, in which efficient gearwheel lubrication and cooling may be achieved.

According to a first aspect of the invention, at least the primary object is achieved by a gearwheel arrangement. Embodiments of the gearwheel arrangement are defined in the dependent claims.

The gearwheel arrangement comprises:
a shaft extending along a longitudinal axis of rotation, the shaft comprising an internal axial duct for guiding lubricant, and
a gearwheel comprising a base portion centred on the shaft and a plurality of gear teeth provided around a periphery of the gearwheel.

The gearwheel arrangement further comprises an internal radial duct for guiding lubricant from the internal axial duct to the gear teeth. The internal radial duct thus extends into the internal axial duct.

By providing an internal radial duct for guiding lubricant from the internal axial duct to the gear teeth, efficient and even lubrication and cooling of the gear teeth may be achieved. The lubricant is guided to the gear teeth via the internal axial duct, the internal radial duct, and further onto the gear teeth.

The internal radial duct extends outward from the internal axial duct. It may extend entirely or partially in a radial direction of the gearwheel, and/or it may extend entirely or partially in an outward direction forming an angle with respect to the radial direction. The outward direction may e.g. be a direction described by a radial and an axial component.

The lubricant may also function as a cooling fluid cooling the gearwheel. The lubricant may be an oil based lubricant, or a water-based lubricant.

The gearwheel may preferably be configured for common rotation with the shaft about the longitudinal axis. The gearwheel and the shaft may in this case be integrated to form a single component, or the gearwheel may be mounted on the shaft and fixed for common rotation therewith.

Optionally, at least a radially inner portion of the internal radial duct extends through the base portion of the gearwheel. This radially inner portion further extends through the shaft and into the internal axial duct.

Optionally, the radially inner portion of the internal radial duct is formed as a bore extending through the base portion and into the internal axial duct. The internal radial duct may comprise a single bore, or a plurality of bores angularly distributed around the longitudinal axis of rotation. It may for example comprise two bores formed at opposite sides of the internal axial duct.

Optionally, the gearwheel arrangement further comprises a gearwheel cover, wherein the internal radial duct extends at least in part within a space provided between the gearwheel cover and an axial side surface of the gearwheel. The axial side surface is herein to be understood as a surface facing in the axial direction. It may be perpendicular to the axial direction, or inclined with respect to the axial direction. The axial side surface may be a side surface of the base portion of the gearwheel.

By means of the gearwheel cover, the internal radial duct may be achieved without compromising the strength of the gearwheel, or with only limited effects on the strength.

The gearwheel cover may for example be made of sheet metal, such as aluminium or steel. Alternatively, a synthetic material may be used.

Optionally, the gearwheel cover comprises a central through-hole for receiving the shaft. The gearwheel arrangement is herein configured such that the gearwheel cover extends all the way to the shaft, the internal radial duct thus comprising on one hand a bore extending only through the shaft and into the internal axial duct, and on the other hand the space provided between the gearwheel cover and the axial side surface of the gearwheel.

Optionally, the gearwheel cover may instead comprise a central through-hole for receiving a central part of the base portion of the gearwheel, through which central part the radially inner portion of the internal radial duct extends. In this case, the gearwheel arrangement is configured such that a part of the internal radial duct extends within the space provided between the gearwheel cover and the axial side surface, while the radially inner portion of the internal radial duct extends through the base portion of the gearwheel and into the internal axial duct, such as via a bore.

Optionally, a sealing is provided between the gearwheel cover and the shaft, and/or between the gearwheel cover and the base portion of the gearwheel. The sealing has the function of preventing leakage of lubricant from the part of the internal radial duct that extends behind the gearwheel cover. The sealing may comprise a sealing ring provided around the above-mentioned central part of the base portion, or around the shaft, depending on the configuration of the gearwheel. The sealing ring may be a separate or integrated radial seal including a polymer seal and a spring, pressing the seal against the base portion or the shaft.

The gearwheel cover may optionally be fixed to the gearwheel, e.g. by using fastening members, or by gluing or welding it onto the gearwheel. Alternatively, it may be provided with an internal thread for threaded engagement with an external thread of the base portion.

A sealing may optionally be provided between the gearwheel cover and the axial side surface of the gearwheel, such as at a radially outermost part of the gearwheel cover. In particular, such a sealing is useful if the gearwheel cover does not reach all the way to the gear teeth. If the gearwheel cover reaches all the way to the gear teeth, a sealing, for example a sealing ring, may instead be provided between the gearwheel cover and the gear teeth, so that outlets are automatically provided between adjacent gear teeth. Alternatively, the gearwheel cover may be tightly fitted against an axial side surface of the gear teeth.

Optionally, the internal radial duct comprises at least one outlet provided between adjacent gear teeth of the plurality of gear teeth. A plurality of outlets are preferably provided, such as between each pair of adjacent gear teeth. Efficient lubrication and cooling are thereby achieved. The internal radial duct may be shaped as a nozzle in connection with the outlet, so as to increase the pressure of the lubricant and direct the lubricant in a desired direction.

Optionally, the internal radial duct comprises a radially outer portion formed as at least one bore extending from the at least one outlet and into the space provided between the gearwheel cover and the axial side surface of the gearwheel. This radially outer portion may be inclined with respect to a radially inner portion of the internal radial duct and/or with respect to the axial side surface, as seen in a section along the longitudinal axis. The internal radial duct may thus comprise a radially inner portion, extending into the internal axial duct, a middle portion extending behind the gearwheel cover, and the radially outer portion ending with the at least one outlet.

Optionally, the at least one outlet is configured for discharging the lubricant provided via the internal radial duct in a direction of extension of the gear teeth.

Optionally, the plurality of gear teeth are helical gear teeth and the gearwheel is configured for rotation in a direction of rotation about the longitudinal axis, wherein the at least one outlet is arranged so that, during rotation of the gearwheel in the direction of rotation, the lubricant is forced to flow along the gear teeth. Thus, the forces induced by rotation of the gearwheel make the lubricant, provided via the internal radial duct, to flow away from the at least one outlet and onto the gear teeth.

According to a second aspect of the invention, at least the primary object is also achieved by a gear assembly comprising:

the gearwheel arrangement according to the first aspect, the gearwheel of the gearwheel arrangement constituting a first gearwheel of the gear assembly, the first gearwheel comprising a first meshing portion comprising the gear teeth of the first gearwheel, a second gearwheel comprising a second meshing portion configured for meshing engagement with the first gearwheel, wherein the second meshing portion extends past the first meshing portion in an axial direction of the first gearwheel. During rotation of the first gearwheel in the direction of rotation, lubricant is guided along the gear teeth of the first gearwheel and further onto the second meshing portion of the second gearwheel. Efficient lubrication and cooling of the meshing portions of both gearwheels is thereby achieved, without having to provide any separate lubrication system for the second gearwheel.

The second meshing portion may extend past the first meshing portion at only one side of the gear assembly, in particular if a gearwheel cover is provided. In this case, the second meshing portion may extend past the first meshing portion only at the opposite side of the gear assembly with respect to the gearwheel cover. Clearance between the second meshing portion and the gearwheel cover is thereby provided. Such clearance may also be achieved by reducing the gear tooth height of the second gearwheel at the side of the gearwheel cover.

The gear assembly may also comprise further gearwheels configured for meshing engagement with the first gearwheel and/or with the second gearwheel.

Optionally, the second meshing portion is wider than the first meshing portion as measured in the axial direction. This ensures that the second gearwheel catches the lubricant thrown off the first gearwheel during rotation.

Further advantages and advantageous features of the gear assembly appear from the above description of the first aspect of the invention.

According to a third aspect of the invention, at least the primary object is also achieved by a transmission for a vehicle, the transmission comprising the gearwheel arrangement according to the first aspect, and/or the gear assembly according to the second aspect. Advantages and advantageous features of the transmission appear from the above description of the first and second aspects of the invention.

According to a fourth aspect of the invention, at least the primary object is also achieved by a powertrain of a vehicle, comprising the transmission according to the third aspect.

Optionally, the powertrain further comprises at least one electric machine configured for propulsion of the vehicle, and/or at least one other propulsion unit configured to be operated at a relatively high rotational speed. Such a propulsion unit may for example be a turbo compound engine, or an engine using a Rankine cycle to recover heat from exhaust. Further advantages and advantageous features of the powertrain appear from the above description of the first, second and third aspects of the invention.

According to a fifth aspect of the invention, at least the primary object is also achieved by a vehicle comprising a gearwheel arrangement according to the first aspect, and/or the gear assembly according to the second aspect, and/or the transmission according to the third aspect, and/or the powertrain according to the fourth aspect. Advantages and advantageous features of the vehicle appear from the above description of the other aspects of the invention.

The vehicle may optionally be a fully electrified vehicle, or a hybrid vehicle comprising at least one combustion engine in addition to one or more electric machines.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
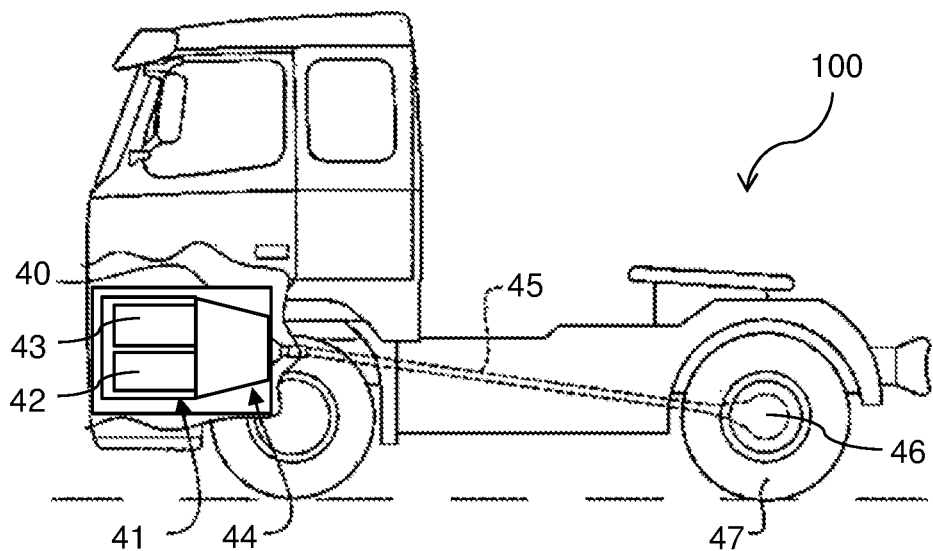
FIG. 1 is a side view of a vehicle in which a gearwheel arrangement according to the invention may be applied.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

A vehicle 100 in the form of a truck according to an embodiment of the invention is schematically shown in FIG. 1. The vehicle 100 includes a powertrain 40 with an electric machine assembly 41 for propulsion of the vehicle 100. The electric machine assembly 41 comprises in the shown embodiment two electric machines 42, 43, connected to a transmission 44. The transmission 44 is arranged to transfer torque from the electric machine assembly 41 to a drive shaft 45 connecting the transmission 44 to a driving axle 46 that drives driving wheels 47 of the vehicle 100. Thus, in the shown embodiment, the vehicle 100 is a fully electrified vehicle configured to be driven solely by the electric machine assembly 41. The vehicle 100 may be arranged with more than one driving axle, such as two or more driving axles.

Although the electric machine assembly 41 is in FIG. 1 illustrated to be located in the front of the vehicle 100, other powertrain configurations are possible. In alternative embodiments, the powertrain of the vehicle may be integrated with the driving axle(s) of the vehicle, such as one or more rear axles, or with the driving wheels or hubs.

The electric machine assembly 41 of the vehicle 100 may comprise only one electric machine, or alternatively more than two electric machines, such as three or four electric machines. The vehicle may also be a hybrid vehicle, provided with a combustion engine in addition to the electric machine assembly 41. The electric machine(s) may be in the form of electric motor(s)/generator(s).

Figure 2:
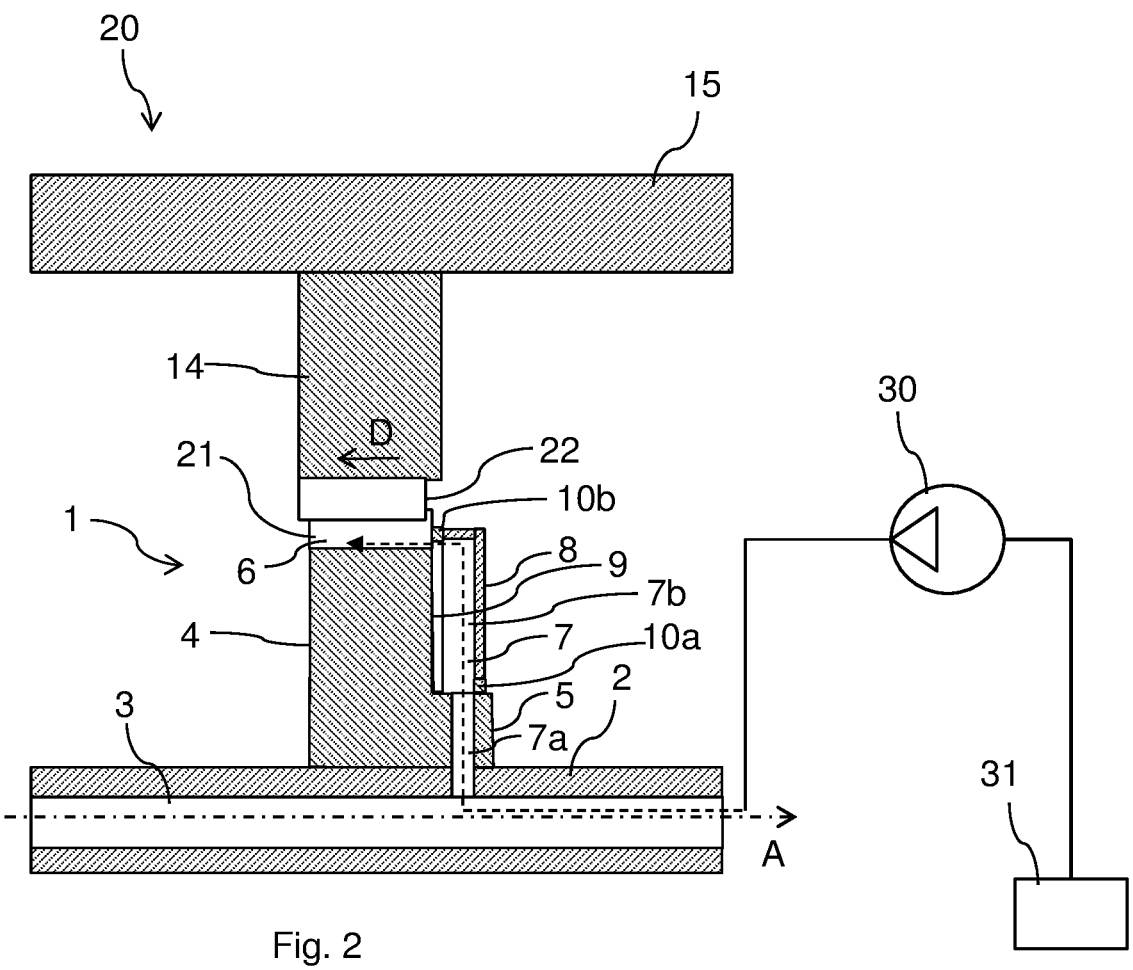
FIG. 2 is a sectional view showing parts of a gear assembly according to a first embodiment.
Figure 3:
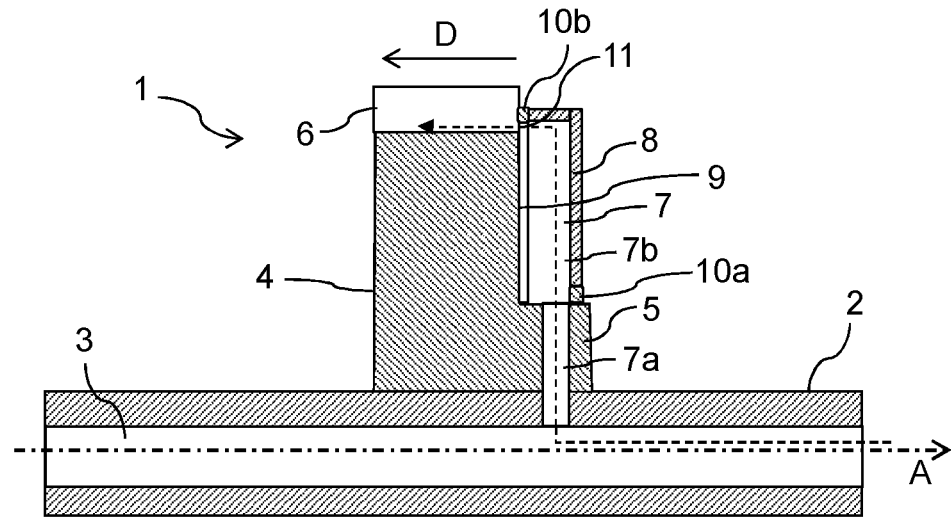
FIG. 3 is a partial sectional view showing a gearwheel arrangement of the gear assembly in FIG. 2.

A gear assembly 20 including a gearwheel arrangement 1 according to a first embodiment of the invention is illustrated in FIG. 2. Reference is also made to FIG. 3, showing the gearwheel arrangement 1 in further detail.

A first gearwheel 4 of the gear assembly 20 is fixed on a first shaft 2 extending along a longitudinal axis of rotation A. In other words, the first gearwheel 4 is arranged for common rotation with the first shaft about the longitudinal axis A. The first gearwheel 4 comprises a base portion 5, centred on the first shaft 2, and a first meshing portion 21 comprising a plurality of gear teeth 6 provided around a periphery of the first gearwheel 4. For simplicity, only a meshing half of the gearwheel 4 is shown in the figures. The gearwheel 4 may be symmetric around the longitudinal axis A, or at least the meshing portion 21 may be symmetric.

The first gearwheel 4 is arranged for meshing engagement with a second meshing portion 22 of a second gearwheel 14, mounted on a second shaft 15. In the present embodiment, the first and second shafts 2, 15 extend in parallel, but in alternative embodiments, the shafts may be non-parallel.

In the first shaft 2, an internal axial duct 3 is provided for guiding lubricant through the first shaft 4. The internal axial duct 3 is connected to a lubricant pump 30, in turn connected to a lubricant reservoir 31, such as an oil sump or similar. The internal axial duct 3 is herein shown as extending through the entire first shaft 2, but it may in other embodiments extend only partially through the first shaft.

An internal radial duct 7, extending into the internal axial duct 3, is provided for guiding lubricant from the internal axial duct 3 to the gear teeth 6 of the first gearwheel 4. A radially inner portion 7a of the internal radial duct 7 is formed as a bore extending through a central part of the base portion 5 of the first gearwheel 4 and into the internal axial duct 3.

Figure 6:
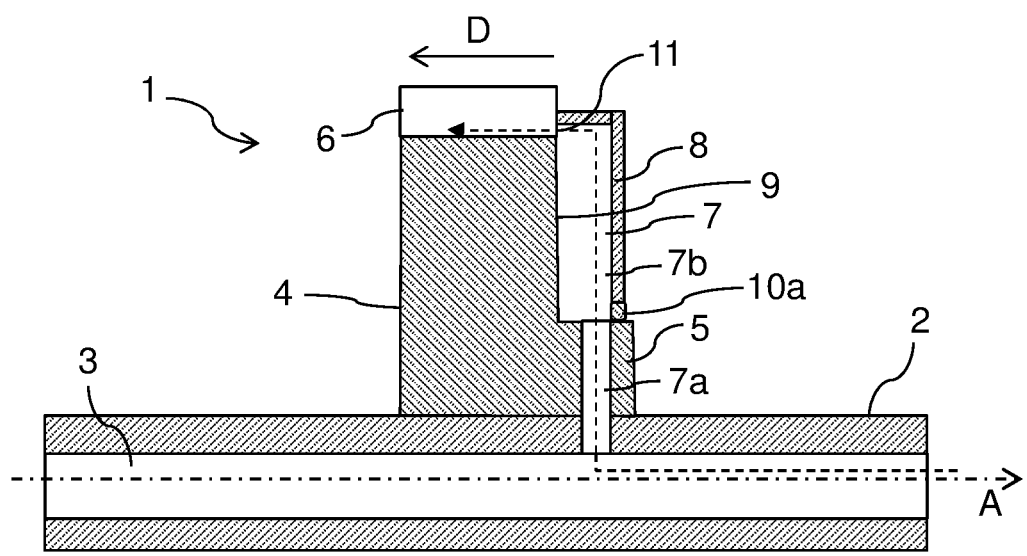
FIG. 6 is a partial sectional view showing a gearwheel arrangement according to another embodiment.

The gearwheel arrangement 1 further comprises a gearwheel cover 8 in the form of an annular disk. The gearwheel cover 8 is sealed against the central part of the base portion 5 by means of a first sealing ring 10a. It is positioned such that a space 7b is provided between the gearwheel cover 8 and an axial side surface 9 of the gearwheel 4. The space 7b forms a radially outer portion of the internal radial duct 7. Thus, the radially inner portion 7a opens into the space 7b provided behind the gearwheel cover 8. The gearwheel cover 8 is further sealed against the gear teeth 6 by means of a second sealing ring 10b. Between each pair of adjacent gear teeth 6, an outlet 11 is formed, through which outlet 11 lubricant may be guided onto the gear teeth 6. The outlet 11 is configured for discharging the lubricant provided via the internal radial duct 7 in a direction of extension D of the gear teeth 6. Instead of providing a second sealing ring 10b, the gearwheel cover 8 may be in direct contact with the axial side surface 9 of the first meshing portion 21, as shown in FIG. 6. Although not illustrated, the gearwheel 4 and/or one of the gearwheel cover 8 (if no sealing ring is provided) and the second sealing ring 10b (if provided), may be shaped such that a nozzle with a conical inlet and a straight conduit is provided for guiding the lubricant toward the outlet 11. The lubricant may thereby be directed onto the adjacent gear tooth 6, and its pressure increased so that it reaches sufficiently far on the gear tooth 6.

The second meshing portion 22 extends past the first meshing portion 21 in the direction of extension D of the gear teeth 6, i.e. on a side of the gear assembly 20 which is opposite to the gear wheel cover 8.

Figure 5:
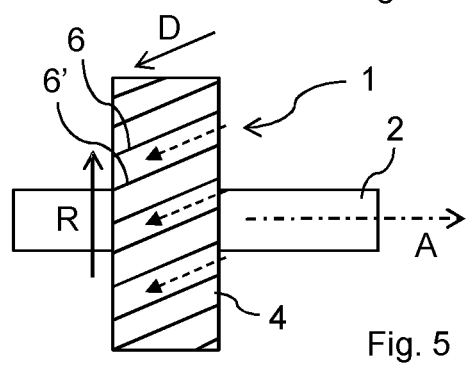
FIG. 5 is a side view of a gearwheel arrangement according to an embodiment.

During operation of the gear assembly 20, lubricant is pumped from the lubricant reservoir 31 into the internal axial duct 3, further into the internal radial duct 7, and onto the gear teeth 6, as indicated by the dashed arrow in FIG. 2. As further illustrated schematically in FIG. 5, the gear teeth 6 may be helical gear teeth formed so that rotation of the first gearwheel 4 in a direction of rotation R induces a flow of the lubricant along the gear teeth 6, as indicated by the dashed arrows. For the purpose of illustration, the gearwheel cover 8 and the outlets 11 have been omitted in FIG. 5. The outlets may be provided between adjacent gear teeth 6, 6'.

Figure 4:
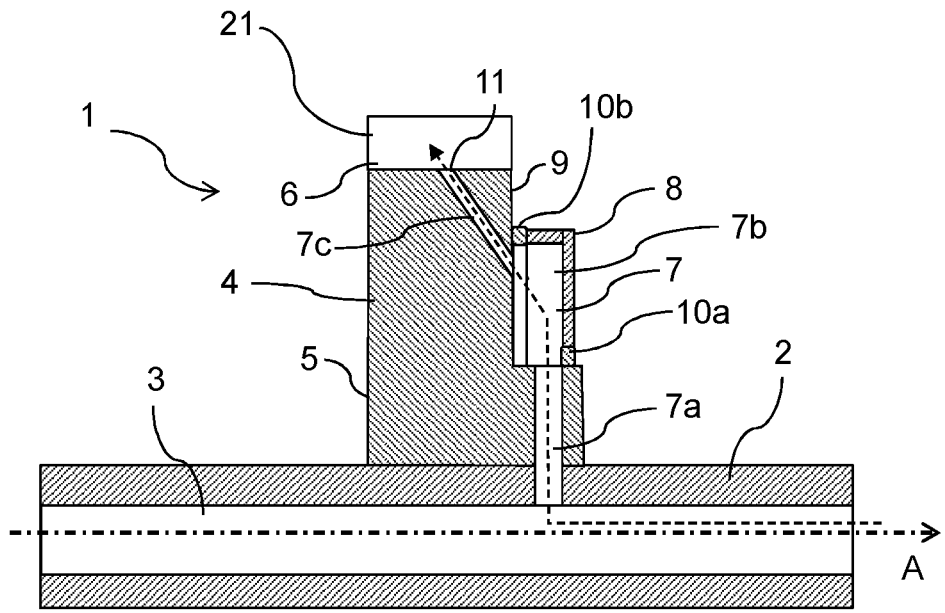
FIG. 4 is a partial sectional view of a gearwheel arrangement according to a second embodiment.

A gearwheel arrangement 1 according to a second embodiment is schematically shown in FIG. 4. This embodiment differs from the first embodiment in that the internal radial duct 7 comprises a radially outer portion 7c. The radially outer portion 7c is formed as a bore 7c extending from the outlet 11 provided in the meshing portion 21, between adjacent gear teeth 6 of the gearwheel 4, and into the space 7b provided behind the gearwheel cover 8. As shown, the gearwheel cover 8 may in this case have a significantly smaller radial extension than the base portion 5 of the gearwheel 4. A second sealing ring 10b may as shown thus seal against the axial side surface 9, radially outside of an inlet to the bore 7c. Of course, the gearwheel 4 may comprise a plurality of bores 7c angularly spaced around the longitudinal axis A. Also in this embodiment, the gear teeth 6 may be helical gear teeth as described above with reference to FIG. 5.

It is to be understood that the present invention is not limited to the embodiments described above and illustrated in the drawings; rather, the skilled person will recognize that many changes and modifications may be made within the scope of the appended claims.

The invention claimed is:

1. A gearwheel arrangement, comprising:
    a shaft extending along a longitudinal axis of rotation, the shaft comprising an internal axial duct for guiding lubricant,
    a gearwheel comprising a base portion centered on the shaft and a plurality of gear teeth provided around a periphery of the gearwheel, and
    a gearwheel cover,
    wherein the gearwheel arrangement further comprises an internal radial duct for guiding lubricant from the internal axial duct to the gear teeth,
    wherein the internal radial duct extends at least in part within a space provided between the gearwheel cover and an axial side surface of the gearwheel, the space forming a radially outermost portion of the internal radial duct,
    wherein the gearwheel cover is in direct contact with an axial side surface of the gear teeth, so that an outlet of the internal radial duct is provided between each pair of adjacent gear teeth of the plurality of gear teeth, and
    wherein at least a radially inner portion of the internal radial duct extends through the base portion of the gearwheel.

2. The gearwheel arrangement according to claim 1, wherein the radially inner portion of the internal radial duct is formed as a bore extending through the base portion and into the internal axial duct.

3. The gearwheel arrangement according to claim 1, wherein the gearwheel cover comprises a central through-hole for receiving the shaft, or for receiving a central part of the base portion of the gearwheel.

4. The gearwheel arrangement according to claim 3, wherein a sealing is provided between the gearwheel cover and the shaft, and/or between the gearwheel cover and the base portion of the gearwheel.

5. The gearwheel arrangement according to claim 1, wherein the outlet is configured for discharging the lubricant provided via the internal radial duct in a direction of extension of the gear teeth.

6. The gearwheel arrangement according to claim 1, wherein the plurality of gear teeth are helical gear teeth and the gearwheel is configured for rotation in a direction of rotation about the longitudinal axis, and wherein the outlet is arranged so that, during rotation of the gearwheel in the direction of rotation, the lubricant is forced to flow along the gear teeth.

7. A gear assembly comprising:
    the gearwheel arrangement according to claim 1, the gearwheel of the gearwheel arrangement constituting a first gearwheel of the gear assembly, the first gearwheel comprising a first meshing portion comprising the gear teeth of the first gearwheel,
    a second gearwheel comprising a second meshing portion configured for meshing engagement with the first gearwheel,
    wherein the second meshing portion extends past the first meshing portion in an axial direction of the first gearwheel.

8. The gear assembly of claim 7, wherein the second meshing portion is wider than the first meshing portion as measured in the axial direction.

9. A transmission for a vehicle, the transmission comprising the gearwheel arrangement according to claim 1.

10. A powertrain of a vehicle, comprising the transmission according to claim 9.

11. A vehicle comprising the gearwheel arrangement according to claim 1.

12. A gearwheel arrangement, comprising:
    a shaft extending along a longitudinal axis of rotation, the shaft comprising an internal axial duct for guiding lubricant,
    a gearwheel comprising a base portion centered on the shaft and a plurality of gear teeth provided around a periphery of the gearwheel,
    a gearwheel cover,
    wherein
    the gearwheel arrangement further comprises an internal radial duct for guiding lubricant from the internal axial duct to the gear teeth, wherein the internal radial duct extends at least in part within a space delimited by the gearwheel cover and an axial side surface of the gearwheel, the space forming a radially outermost portion of the internal radial duct,
    wherein a sealing ring is provided that seals between the gearwheel cover and an axial side surface of the gear teeth, the sealing ring being configured so that an outlet of the internal radial duct is provided between each pair of adjacent gear teeth of the plurality of gear teeth.

13. A gear assembly comprising:
    the gearwheel arrangement according to claim 12, the gearwheel of the gearwheel arrangement constituting a first gearwheel of the gear assembly, the first gearwheel comprising a first meshing portion comprising the gear teeth of the first gearwheel, a second gearwheel comprising a second meshing portion configured for meshing engagement with the first gearwheel,
    wherein the second meshing portion extends past the first meshing portion in an axial direction of the first gearwheel.

14. A transmission for a vehicle, the transmission comprising the gearwheel arrangement according to claim 12.

15. A vehicle comprising the gearwheel arrangement according to claim 12.

16. The gearwheel arrangement according to claim 12, wherein at least a radially inner portion of the internal radial duct extends through the base portion of the gearwheel.

17. The gearwheel arrangement according to claim 16, wherein the radially inner portion of the internal radial duct is formed as a bore extending through the base portion and into the internal axial duct.

18. The gearwheel arrangement according to claim 12, wherein the gearwheel cover comprises a central through-hole for receiving the shaft, or for receiving a central part of the base portion of the gearwheel.

19. The gearwheel arrangement according to claim 18, wherein a sealing is provided between the gearwheel cover and the shaft, and/or between the gearwheel cover and the base portion of the gearwheel.

* * * * *